US012060860B2

(12) United States Patent
Koegel et al.

(10) Patent No.: US 12,060,860 B2
(45) Date of Patent: Aug. 13, 2024

(54) SEAT PLATE FOR AN INJECTOR

(71) Applicant: LIEBHERR-COMPONENTS DEGGENDORF GMBH, Deggendorf (DE)

(72) Inventors: Verena Koegel, Ortenburg (DE); Norbert Schoefbaenker, Ohlsdorf (AT)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 666 days.

(21) Appl. No.: 16/973,393

(22) PCT Filed: Jun. 4, 2019

(86) PCT No.: PCT/EP2019/064465
§ 371 (c)(1),
(2) Date: Dec. 8, 2020

(87) PCT Pub. No.: WO2019/234007
PCT Pub. Date: Dec. 12, 2019

(65) Prior Publication Data
US 2021/0254591 A1 Aug. 19, 2021

(30) Foreign Application Priority Data
Jun. 8, 2018 (DE) ..................... 10 2018 113 662.5

(51) Int. Cl.
*F02M 63/00* (2006.01)

(52) U.S. Cl.
CPC ............................... *F02M 63/0077* (2013.01)

(58) Field of Classification Search
CPC ............. F02M 63/0077; F02M 55/008; F02M 47/027; F02M 51/0628; F02M 51/0632
(Continued)

(56) References Cited

U.S. PATENT DOCUMENTS 3,632,081 A * 1/1972 Evans ................. F16K 31/0665 251/333
3,871,615 A * 3/1975 Donner ............... F16K 31/0668 251/327
(Continued)

FOREIGN PATENT DOCUMENTS

CN 203175733 U 9/2013
DE 19738351 A1 3/1998
(Continued)

OTHER PUBLICATIONS

Adachi et al., JP2011169242A, Google Patent English Translation (Year: 2011).*
(Continued)

*Primary Examiner* — Chee-Chong Lee
(74) *Attorney, Agent, or Firm* — McCoy Russell LLP

(57) ABSTRACT

The present invention relates to a seat plate for an injector, comprising: a planar main body having a first flat side and a second flat side; a passage, which extends through the planar main body from the first flat side to the second flat side; and an indentation region in the first flat side, which indentation region surrounds an opening of the passage. The seat plate is characterised in that a plurality of webs are formed in the first flat side through the indentation region, the ratio of length to width of each web lying in the range of 2.5-3.5:1, preferably in the range from 2.7-3.3:1, more preferably in the range from 2.9-3.1:1.

12 Claims, 5 Drawing Sheets

(58) Field of Classification Search
USPC .................................................... 239/533.11
See application file for complete search history.

(56) References Cited

U.S. PATENT DOCUMENTS

| | | | | | |
|---|---|---|---|---|---|
| 4,008,876 | A | * | 2/1977 | Bastle | F02M 63/022 251/76 |
| 4,285,497 | A | * | 8/1981 | Guttel | F16K 31/105 137/625.65 |
| 4,540,155 | A | * | 9/1985 | Redston | F16K 31/0655 251/129.2 |
| 4,561,632 | A | * | 12/1985 | Hugler | F16K 31/082 251/129.2 |
| 4,605,197 | A | * | 8/1986 | Casey | G05D 16/2097 335/229 |
| 6,793,158 | B2 | | 9/2004 | Ricco | |
| 2003/0111547 | A1 | | 6/2003 | Ricco | |
| 2012/0103308 | A1 | | 5/2012 | Heffler et al. | |

FOREIGN PATENT DOCUMENTS

| | | | |
|---|---|---|---|
| DE | 102006000256 | A1 | 2/2007 |
| DE | 102008000171 | A1 | 8/2008 |
| DE | 102009001176 | A1 | 9/2010 |
| DE | 102017116383 | A1 | 1/2019 |
| JP | 2011169242 | A | 9/2011 |
| WO | 2013070579 | A1 | 5/2013 |

OTHER PUBLICATIONS

State Intellectual Property Office of the People's Republic of China, Office Action and Search Report Issued in Application No. 201980038203.0, May 11, 2022, 13 pages. (Submitted with Partial Translation).

ISA European Patent Office, International Search Report Issued in Application No. PCT/EP2019/064465, Aug. 7, 2019, WIPO, 5 pages.

* cited by examiner

SEAT PLATE FOR AN INJECTOR

CROSS REFERENCE TO RELATED APPLICATIONS

The present application is a U.S. National Phase of International Application No. PCT/EP2019/064465 entitled "SEAT PLATE FOR AN INJECTOR," and filed on Jun. 4, 2019. International Application No. PCT/EP2019/064465 claims priority to German Patent Application No. 10 2018 113 662.5 filed on Jun. 8, 2018. The entire contents of each of the above-listed applications are hereby incorporated by reference for all purposes.

TECHNICAL FIELD

The present invention relates to a seat plate for an injector.

BACKGROUND AND SUMMARY

In internal combustion engines such as diesel engines or also gasoline engines a fuel is as a rule injected via an injector into a combustion chamber in a specific quantity and for a specific time period. It is necessary in this process due to the very small injection times that are in the microsecond range to open or close the discharge opening of the injector at a very high frequency.

An injector typically has a nozzle needle (also: injector needle) that allows a highly compressed fuel to exit outwardly on release of a discharge hole of the injector. This nozzle needle acts in cooperation with this discharge opening as a plug that enables a discharge of the fuel when raised. It is therefore accordingly necessary to raise this needle at relatively short time intervals and to allow it to slide back into the discharge opening after a brief period. In this respect, hydraulic servo valves can be used that control the triggering of this movement. Such valves are in turn controlled with the aid of an electromagnet. Alternatively to this, a piezo element can be used that responds faster than the valve controlled by means of electromagnets.

Due to the high injection pressures of more than 2500 bar, it is not possible to control or to move the nozzle needle directly with the aid of a magnetic valve. The required forces for opening and closing the nozzle needle would be too great here so that such a process would only be able to be implemented with the aid of very large electromagnets. Such a design is, however, excluded due to the only limited available installation space in an engine.

So-called servo valves that control the nozzle needle and are themselves or controlled via an electromagnetic valve or a piezo valve are typically used instead of the direct control. In this respect, a pressure level that acts on the nozzle needle in the closure direction is built up in a control space interacting with the nozzle needle with the aid of the available highly compressed fuel. This control space is typically connected to the high pressure region of the fuel via a feed throttle. This control space furthermore has a small closable outflow throttle from which the fuel can escape. This outflow throttle is arranged in the seat plate here. If the fuel escapes, the pressure in the control space and the closure force acting on the nozzle needle is reduced since the highly compressed fuel pressure of the control space can flow off. A movement of the nozzle needle is thereby produced that releases the discharge opening at the injector tip. To be able to control the movement of the nozzle needle, the outflow throttle of the valve arranged in the seat plate is therefore selectively closed or opened with the aid of an armature element.

Since the general principle of an injector for injecting fuel is familiar to the skilled person, the functionality of this component will not be looked at in a more in-depth manner.

The more detailed function of an injector is shown, for example, in DE 10 2017 116 383.2.

It has been found to be particularly advantageous in the new development of an engine if the space taken up by an injector is smaller. This results in a more compact engine design overall and typically in a better weight ratio.

A seat plate that is particularly advantageous with respect to the prior art and that has a reduced outer diameter with respect to conventional seat plates is shown in independent claim 1.

The seat plate in accordance with the invention for an injector here comprises a plate-like base body having a first planar side and a second planar side, a passage that extends through the plate-like base body from the first planar side toward the second planar side, and a recess region in the first planar side that surrounds an opening of the passage. The seat plate is characterized in that a plurality of webs are formed in the first planar side by the recess region, with the ratio of length to width of each web being in the range from 2.5-3.5:1. preferably in the range from 2.7-3.3:1, more preferably in the range from 2.9-3.1:1.

The recess region is here a cutout in the first planar side of the seat plate that otherwise extends in a planar manner. It is arranged around the opening of the passage such that webs extend from the outer margin of the recess region toward the opening of the passage. These webs serve the placement of a closure element (the armature) on the opening of the passage.

The claimed embodiment of the webs reduces the contact area of the closure element of the opening and thus also provides reduced wear at the contacting areas of the closure element and the web section.

The webs are here not part of the recess region and extend in a planar manner toward the rest of the first planar side.

Provision can in particular be made here that three webs are present that enable a stable placement of the closure element.

In this respect, the passage that extends through the plate-like base body from the first planar side toward the second planar side can be configured as an outflow throttle that can represent a discharge for fuel stored under high pressure in a control space. Fuel is here let out to the top toward the first planar side so that the pressure of the control room that starts from the second planar side and that acts downwardly drops.

Provision is made in accordance with a preferred embodiment of the invention that the respective longitudinal directions of the webs are directed toward the opening of the passage. The longitudinal directions of the webs preferably intersect the opening of the passage such that they project from the opening in star shape.

It is furthermore of advantage for the invention if the planar sides of the plate-like base body are aligned in parallel with one another.

In accordance with an advantageous variation of the invention, the recess region is arranged spaced apart from the opening of the passage, that is it preferably has the same distance from the opening of the passage.

A sealing island is spoken of here on which the opening is arranged. The "island" is here surrounded fully peripherally by the recess. The opening of the passage is here therefore not in the recess region, but rather at the normal level of the first planar side. Provision can be made that the sealing island is circular, that is the recess region is uniformly spaced apart around the opening. This enables a particularly efficient placement process on the opening of the passage having the closure element.

Provision can furthermore be made that the seat plate is rotationally symmetrical so that it is preferably not distinguishable on a rotation by 120° from its original position. The axis of rotation can here extend through the passage and is substantially perpendicular to the first planar side and to the second planar side.

It is advantageous in the rotationally symmetrical design that there are a plurality of correct installation orientations on an installation into an injector. The assembly of an injector is thus simplified since at least the insertion of the seat plate can take place without a fixedly predefined orientation.

Provision can also be made here that the plate-like base body is rotationally symmetrical to an axis of rotation extending centrally through the passage. This is of advantage with respect to the installation of the seat plate since there are a plurality of correct installation positions with respect to the rotation with a rotationally symmetrical design and the actually adopted orientation of the seat plate does not have to be considered.

Provision can also be made in accordance with a further development of the invention that the recess region circularly surrounds the opening of the passage and only the plurality of webs interrupt the recess region from an outer margin of the recess region toward the opening. An advantageously formed placement surface thereby results for the closure element (for example an armature element) of the passage or of the opening on the first planar side that has an exceptional fatigue strength and very good closing properties. In addition, a tilting of the closure element that can occur on the placement is suppressed by the webs aligned toward the opening.

Provision can be made in accordance with an optional further development of the invention that the center of the circular recess region is aligned with the opening of the passage. The recess region is therefore circular and has a center point that is aligned with the opening of the passage on the first planar side. I.e. the center of the opening is identical with the center of the circular recess region that is only interrupted by the webs at its outer side.

Provision can furthermore be made in accordance with an advantageous embodiment that the recess region has an inner margin that surrounds the opening of the passage and whose wall extending toward the first planar side has an inclination. The opening of the passage is not in the recess region, but is completely surrounded by it. The edge bounding the recess region has a wall here that has an inclination.

Due to the provision of an angle of inclination, the abutment surface of the closure element that is placed on to close the opening is more resistant toward the chipping of edges in the marginal region of the recess region.

It has proved to be an advantageous angle of inclination of the edge wall here that it should be in the range from 2.5-7.5°, preferably 3.5-6.5°, more preferably 4.5-5.5°. The angle here is measured from the perpendicular on the first planar side inclined toward the wall. In other words, walls of the sealing island on which the opening of the passage is arranged that extend obliquely toward the opening at least in the marginal region are elevated out of the recess region.

The optimum for production and function has to be found for the angle design. The demands are contradictory here. To reduce the diameter scatter of the sealing island in the course of production, angles are necessary that are as small as possible, that is an extent of the wall that is as perpendicular as possible is advantageous. The geometry is then designed such that a relatively small variation in the support surface is produced by tolerances. On the other hand, angles are necessary that are as large as possible to avoid chips that occur due to the striking action in the operation of the seat plate in an injector.

Provision is additionally made in accordance with a further advantageous modification of the invention that the first planar side and the second planar side have a contact surface with a plane in parallel with the respective planar side whose areas are of equal size or differ from one another by less than 7%, preferably less than 5%, and more preferably less than 2%. Provision can likewise be made that the two areas are of substantially the same size.

This is advantageous in the processing of the two planar sides. If they are of equal size or of substantially the same size, or if they are disposed within the deviation given above, a grinding or a removal of material can be carried out uniformly at both sides due by double surface grinding or lapping. Provision can be made here that the marginal regions are chamfered at the outer periphery of a respective planar side to adapt the effective contact surface with a grinding plane or a material machining plane. The simultaneous machining of the two planar sides of the seat plate can thereby be made possible, for example, which accelerates the manufacturing process.

Provision is made in accordance with an advantageous embodiment of the invention that the first planar side and/or the second planar side has/have an angled surface in transition to the outer periphery whose machining brings about an achieving of the desired contact area size of the respective planar side.

Provision can be made in accordance with a further optional modification that the passage flares from the location of a minimal diameter, the restrictor, toward the second planar side and in so doing substantially has the shape of a truncated cone or of a cylinder.

A seat plate wherein an outer periphery of the seat plate is circular, and wherein the circular outer periphery is preferably provided with one or more flat portions. The flat portion or portions inserted into the circular shape provides/provide a conducting of fuel in an installed state of the seat plate. The seat plate is here received in a circular hollow element so that a space for conducting fuel past the seat plate is provided by the at least one flat portion in the outer periphery of the seat plate. This optional flowing around of fuel is a further advantageous property of the seat plate in accordance with the invention. In this respect, the circular sections of the seat plate that are surrounded by the at least one flat portion are guided in a mount to ensure a sealing at their upper side. Fuel simultaneously has to move via a high pressure bore into the high pressure region of the injector. In order not to require an orientation of the seat plate for this purpose, a trihedron can be used, for example, to conduct fuel past the seat plate. The actually annular sealing surface to the housing is reduced in this respect.

Provision can advantageously be made that an outer periphery of the seat plate is circular and the circular form is interrupted by one or more flat portions, and wherein the proportion of the flat portions amounts to at least 30%, preferably 50%, and more preferably at least 80%, of the original circular form of the outer periphery.

Provision can additionally be made that the plurality of flat portions are distributed equidistantly from one another at the outer periphery. In other words, the flat portions are therefore uniformly spaced apart from one another.

In addition, the present invention comprises an injector for injecting fuel having a seat plate in accordance with one of the variants discussed above.

The invention further relates to an injector having a seat plate in accordance with one of the above-described variants.

BRIEF DESCRIPTION OF THE FIGURES

Further advantages, modifications, and details will be explained with reference to the following description of the Figures.

There are shown.

DETAILED DESCRIPTION

Figure 1:
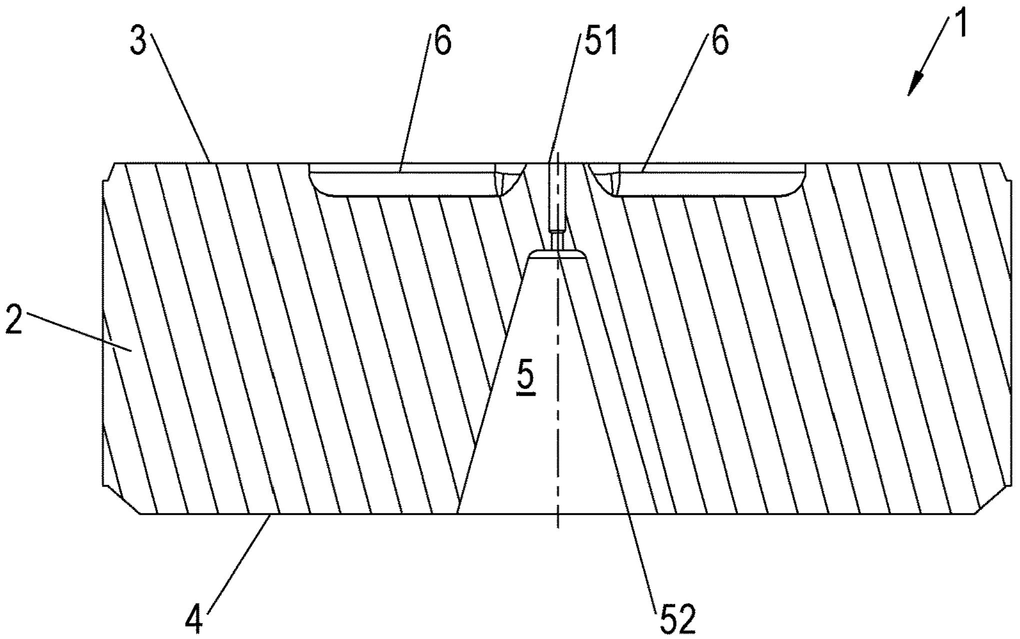
FIG. 1: a cross-sectional view of a seat plate in accordance with the invention.

FIG. 1 shows the seat plate 1 in a cross-sectional view. The approximately plate-shaped base body 2 has an upper planar side 3 and a lower planar side 4. The end faces of the plate-like base body 2 connect the upper and lower planar sides 3, 4 of the base body 2 to one another. It can be recognized that the seat plate 1 has a passage 5 that connects the first planar side 3 to the second planar side 4. This passage extends through the base body 2 of the seat plate 1. Starting from the second planar side 4, the passage 5 has a control space that has the shape of a truncated cone in the illustration; at its acute end the frustoconical control space merges into a restrictor 5 that designates a region of minimal diameter of the passage 5. The passage flares a little toward the first planar side 3 and then merges into an opening 51 in the first planar side 3.

It can further be recognized that the opening 51 is surrounded by a recess zone 6 that is, however, spaced apart from the opening 51.

Figure 2:
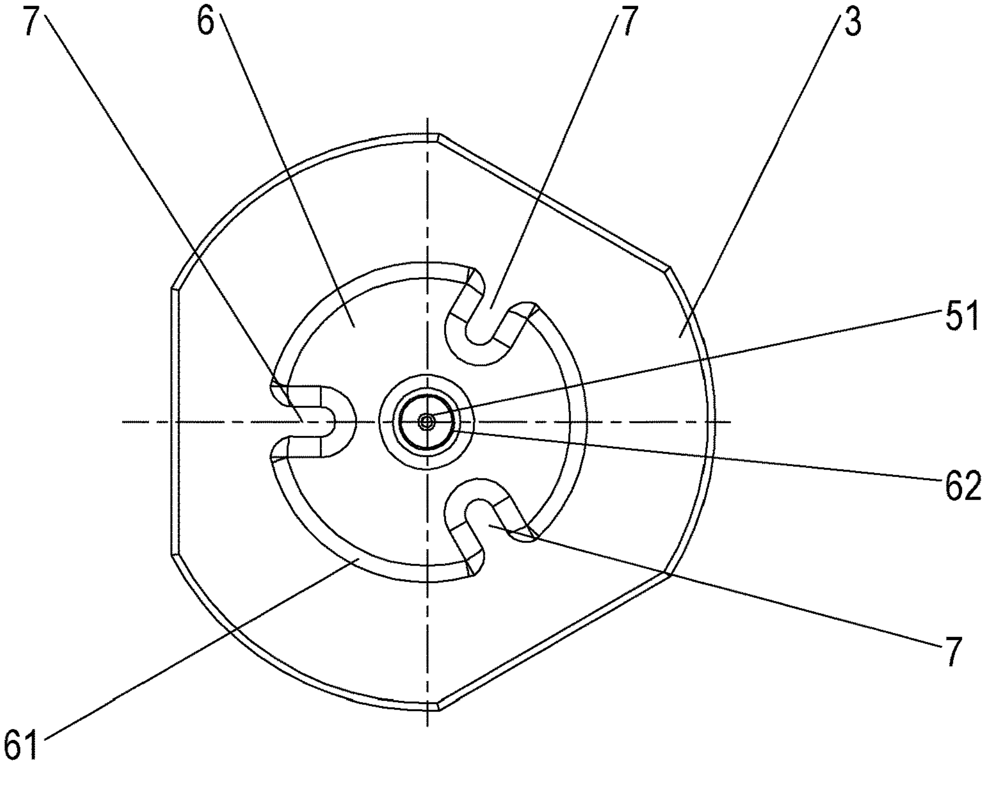
FIG. 2: a plan view of the seat plate in accordance with the invention.

FIG. 2 shows a plan view of the first planar side 3 of the seat plate 1. The opening 51 that is surrounded by the recess region 6 by the same distance is arranged centrally in the seat plate 1. The region that is adjacent to the opening and that extends from the opening 51 up to the margin 62 of the recess zone 6 is also called a scaling island.

The recess region 6 is substantially circular, but has inwardly directed webs 7 that represent elements exempted from the recess region 6 from its outer margin 61 toward the opening 51. In the present case, the three webs 7 are spaced apart from one another at a respective distance of 120°. The webs 7 serve as a support for a closure element, typically also called an armature element, that is placed onto the opening 51 to be closed. To avoid a tilting of this element, a part of the closure element is also seated on the respective sections of the webs 7 directed toward the opening 51.

Figure 3:
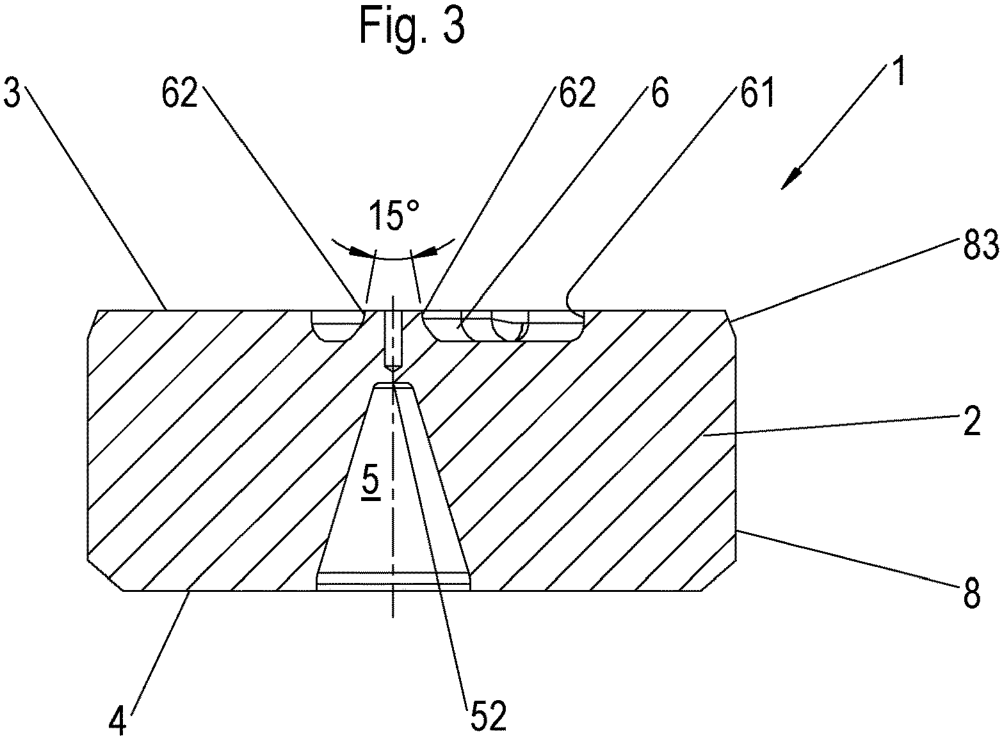
FIG. 3: a cross-sectional view of a seat plate in accordance with the invention with an inclined margin of the recess region.

FIG. 3 is a cross-sectional view of a modified seat plate 1. Unlike FIG. 1, the marginal region 62 of the recess region 6 now no longer extends perpendicular upwardly to the scaling island, but rather has an angle of inclination. In the illustration, the angle of inclination amounts to 7.5° so that the angular value shown of 15° results on a measurement of the angle between oppositely disposed marginal regions.

The inclination is of advantage since otherwise chips occur at the edge 62, that are to be avoided, due to the repeated placement of the closure element on the sealing island. The likelihood of a chip is reduced by the inclination of the margins 62 of the recess region toward the scaling island.

Figure 4:
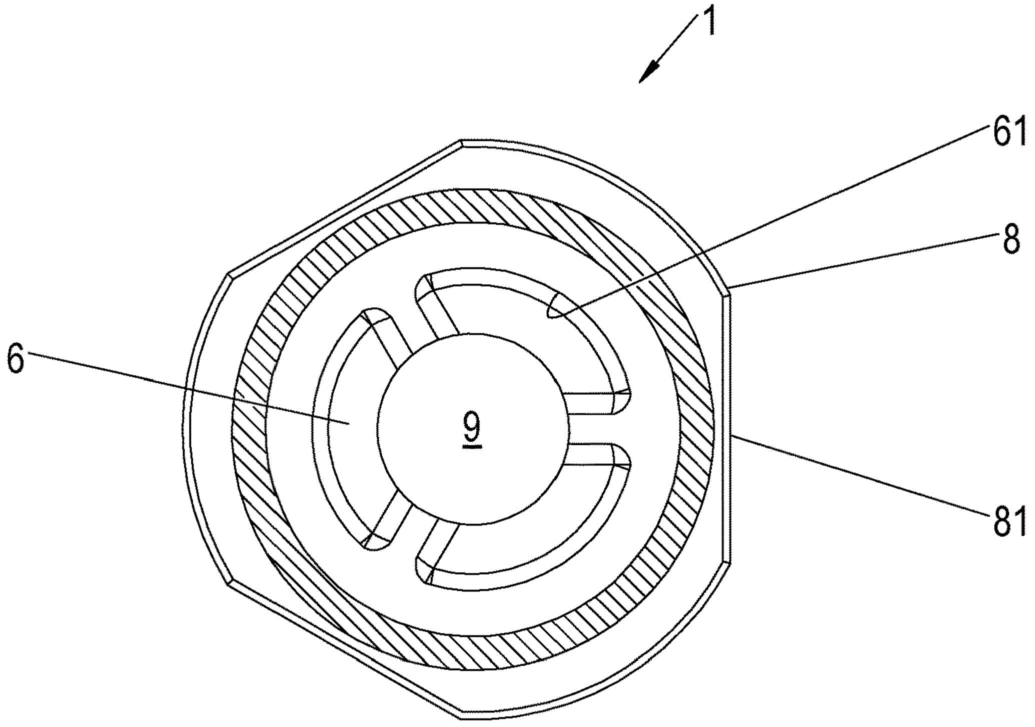
FIG. 4: a plan view of the seat plate in accordance with the invention with a closure element placed on it.

FIG. 4 shows a plan view of the first planar side 3 of the seat plate 9, with the closure element 9 also being shown. It can be recognized that the closure element 9 also strikes the webs when it is moved into its position closing the opening 51.

A flat portion that interrupts the actually circular shape of the outer periphery 8 can be recognized at the outer periphery 8 of the seat plate 1. These flat portions extend in a straight line and are typically arranged equidistantly from one another along the outer periphery. The segments of the circular shape of the outer periphery 8 are located between the flat portions 81 of the outer periphery 8. These segments serve a holding in a circular housing into which the seat plate 1 is placed.

Figure 5:
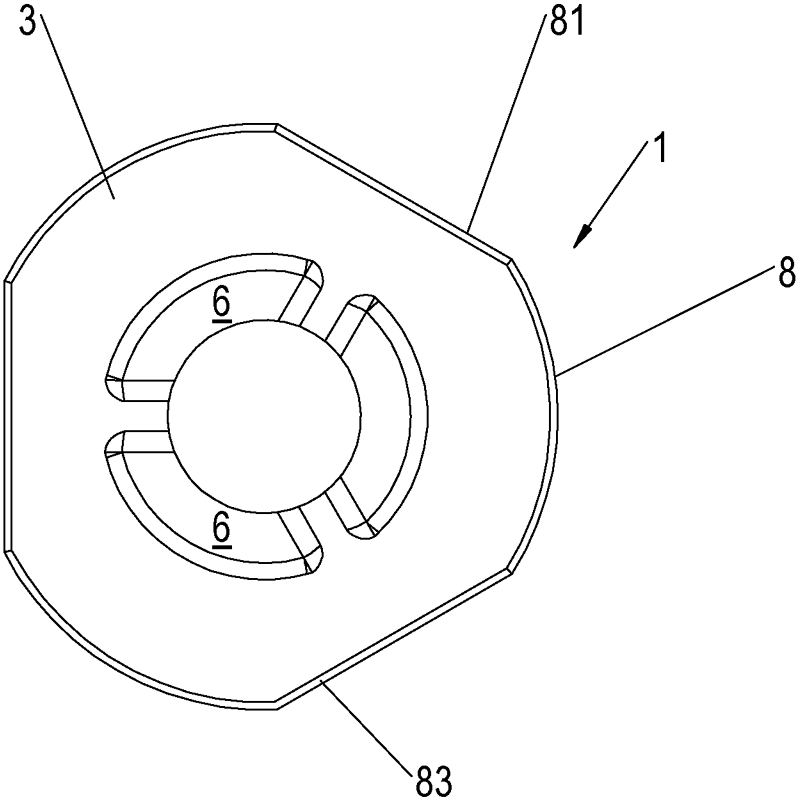
FIG. 5: a further plan view of the seat plate in accordance with the invention with a closure element placed thereon.

FIG. 5 likewise shows a schematic plan view of the seat plate 1. A surface 83 can be recognized here in the transition region to the outer periphery 8 of the first planar side 3 that is angled with respect to the first planar side 3 and that is present both at the transition to the flat portions 81 and at the remaining segments of the circular shape. This angled surface is of advantage since the support surface of the first planar side 3 is variable by machining this surface. It is thus now possible to match the support surfaces of the first planar side 3 and of the second planar side 4 to one another, whereby material removing machining processes can be carried out simultaneously at both planar sides.

Figure 6:
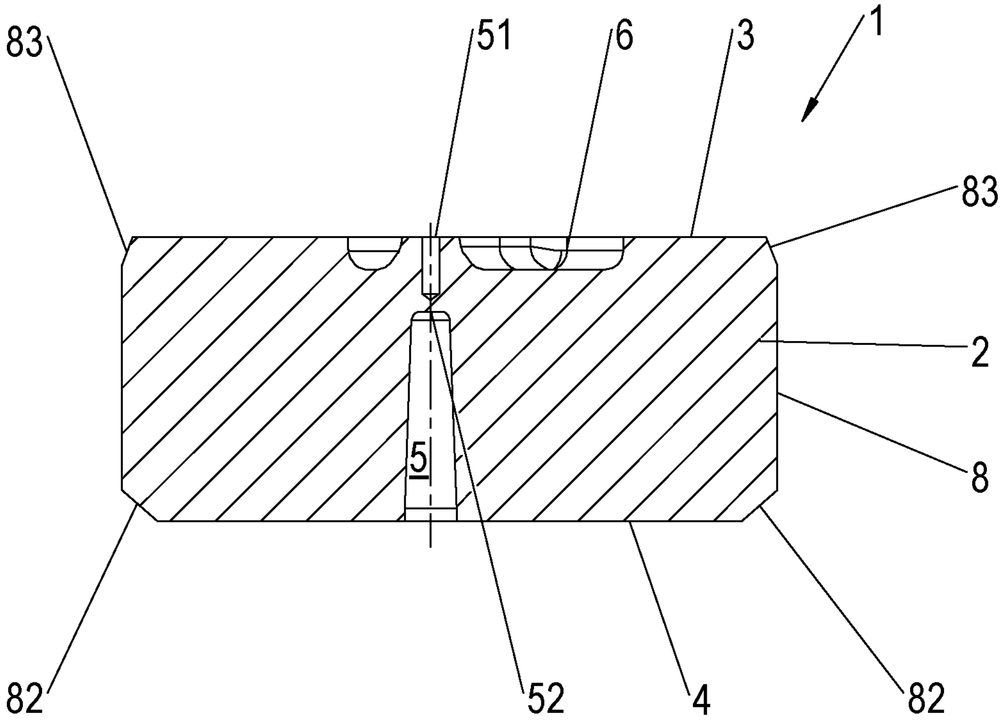
FIG. 6: a cross-sectional view of a seat body in accordance with the invention with a cylindrical control space.

FIG. 6 shows a cross-section of the seat plate 1 in which an angled surface 82 can likewise be recognized in the transition region from the second planar side 4 toward the outer periphery 8 that provides the same advantages described in the preceding paragraph A cylindrical control space that is arranged between the restrictor 52 and the second planar side 4 can additionally be recognized.

Figure 7:
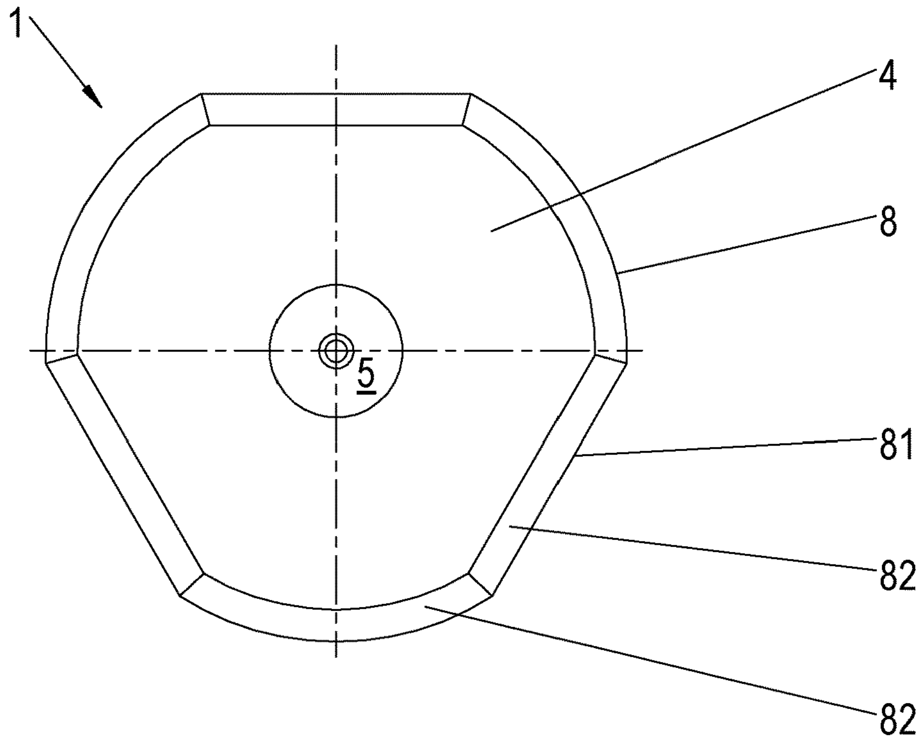
FIG. 7: a plan view of a lower side of the seat plate.

FIG. 7 shows a plan view of the second planar side 4 of the seat plate 1. The very much larger opening of the passage 5 and the angled surfaces that are arranged in the transition from the second planar side 4 toward the outer periphery 8 can be recognized here.

Figure 8:
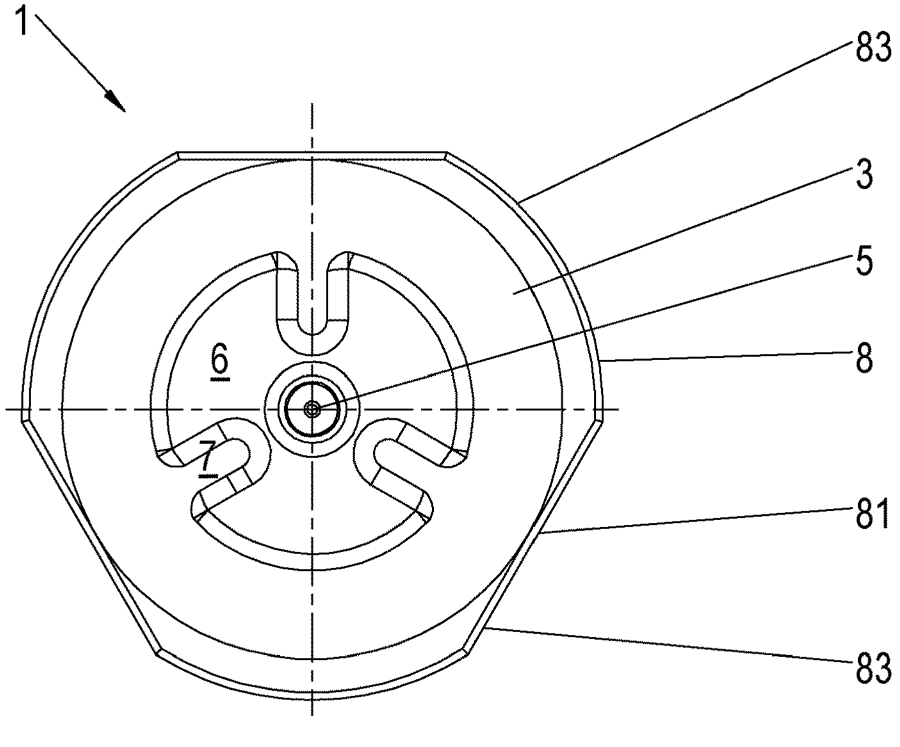
FIG. 8: a plan view of the seat plate in accordance with the invention.

FIG. 8 shows a plan view of the first planar side 3. In addition, it becomes clear on the basis of a dashed auxiliary circle that has its center at the center of the opening 51 of the passage 5 that the flat portions extend tangentially to this auxiliary circle. The contact points of the flat portions 81 with the auxiliary circle are here arranged equidistantly along the auxiliary circle.

Provision can additionally be made that the webs 7 in the recess region 6 extend radially inwardly offset toward the opening 51 starting from the contact point.

Figure 9:
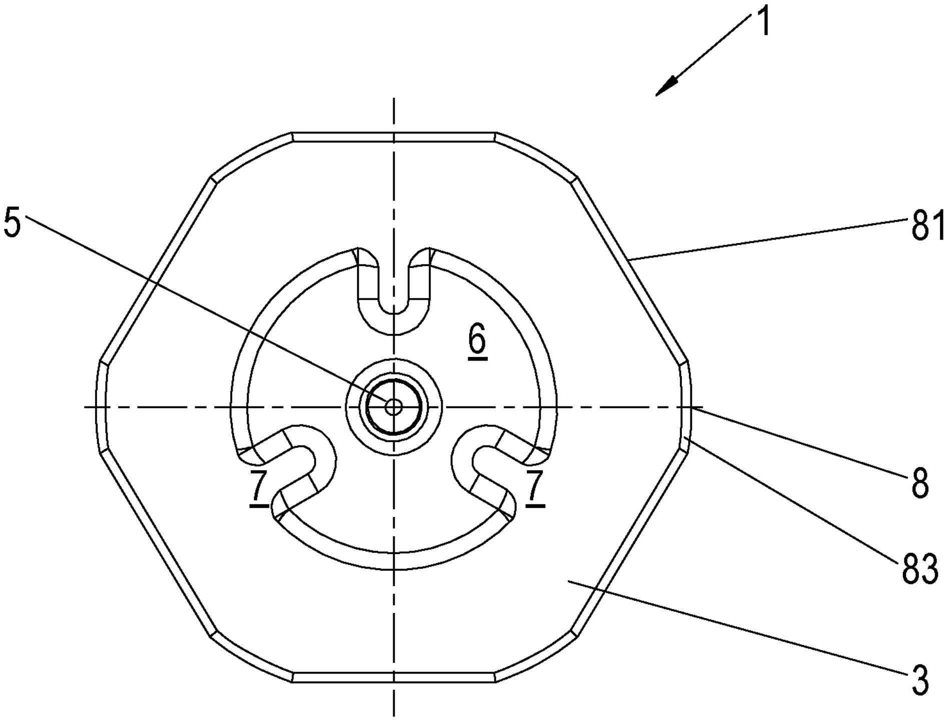
FIG. 9: a plan view of a further embodiment of the seat plate.

FIG. 9 shows a plan view of a further embodiment of the seat plate 1. Unlike the preceding seat plates 1, the seat plate 1 shown in FIG. 9 now has a total of six flat portions 81

Figure 10:
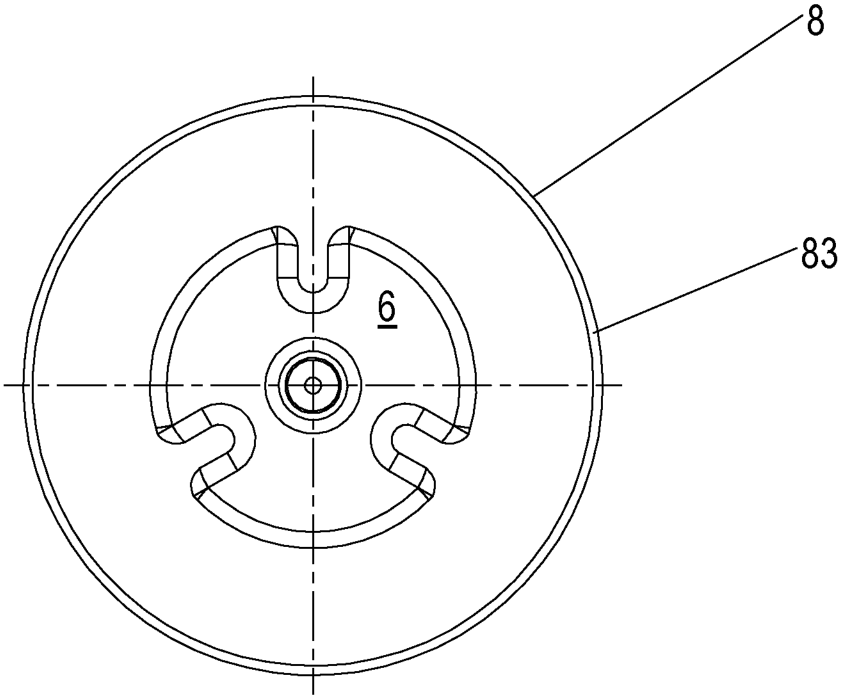
FIG. 10: a plan view of a further embodiment of the seat plate.

FIG. 10 shows a plan view of a further embodiment of the seat plate 1. Unlike the preceding seat plates 1, the outer periphery 8 of the seat plate 1 is circular and does not have any flat portions.

In accordance with a variation of the previously presented solution, it is possible that the seat plate is designed without the bore 61 and that the bore 52 is continuous.

The invention claimed is:

1. A seat plate for an injector comprising:

a plate-like base body having a first planar side and a second planar side;

a passage that extends through the plate-like base body from the first planar side toward the second planar side; and a recess region in the first planar side that surrounds an opening of the passage, wherein a plurality of webs are formed in the first planar side by the recess region, with a ratio of length to width of each web being in the range from 2.5-3.5:1, wherein the first planar side and the second planar side have a contact surface with a plane in parallel with a respective planar side whose areas are of equal size or differ from one another by less than 7%, wherein the first planar side and/or the second planar side has/have an angled surface in a transition directly to an outer periphery whose machining brings about an achieving of a desired contact area size of the respective planar side, and wherein the outer periphery of the seat plate is circular and has one or more flat portions that are substantially perpendicular to the first and second planar sides.

2. The seat plate in accordance with claim 1, wherein respective longitudinal directions of the webs are aligned with the opening of the passage.

3. The seat plate in accordance with claim 1, wherein the recess region is arranged spaced apart from the opening of the passage and has the same distance from the opening of the passage.

4. The seat plate in accordance with claim 1, wherein the seat plate is arranged rotationally symmetrically with a rotation of 120°.

5. The seat plate in accordance with claim 1, wherein the recess region circularly surrounds the opening of the passage and only the plurality of webs interrupt the recess region from an outer margin of the recess region toward the opening.

6. The seat plate in accordance with claim 5, wherein a center of the circular recess region is aligned with the opening of the passage.

7. The seat plate in accordance with claim 1, wherein the recess region has an inner margin that surrounds the opening of the passage and whose wall extending toward the first planar side has an inclination.

8. The seat plate in accordance with claim 7, wherein the wall has an angle of inclination in the range from 2.5-7.5°, that differs from the perpendicular on the first planar side.

9. The seat plate in accordance with claim 1, wherein the passage flares from a location of a minimal diameter, toward the second planar side and in so doing substantially has the shape of a truncated cone or of a cylinder.

10. The seat plate in accordance with claim 1, wherein a proportion of the one or more flat portions amounts to at least 30% of an original circular form of the outer periphery.

11. The seat plate in accordance with claim 1, wherein the one or more flat portions are distributed equidistantly from one another at the outer periphery.

12. An injector for injecting fuel having the seat plate in accordance with claim 1.

* * * * *